Oct. 9, 1951 F. J. HANSGIRG 2,570,232
CONTINUOUS PROCESS FOR RECOVERY OF MAGNESIUM
Filed June 26, 1945 3 Sheets-Sheet 1
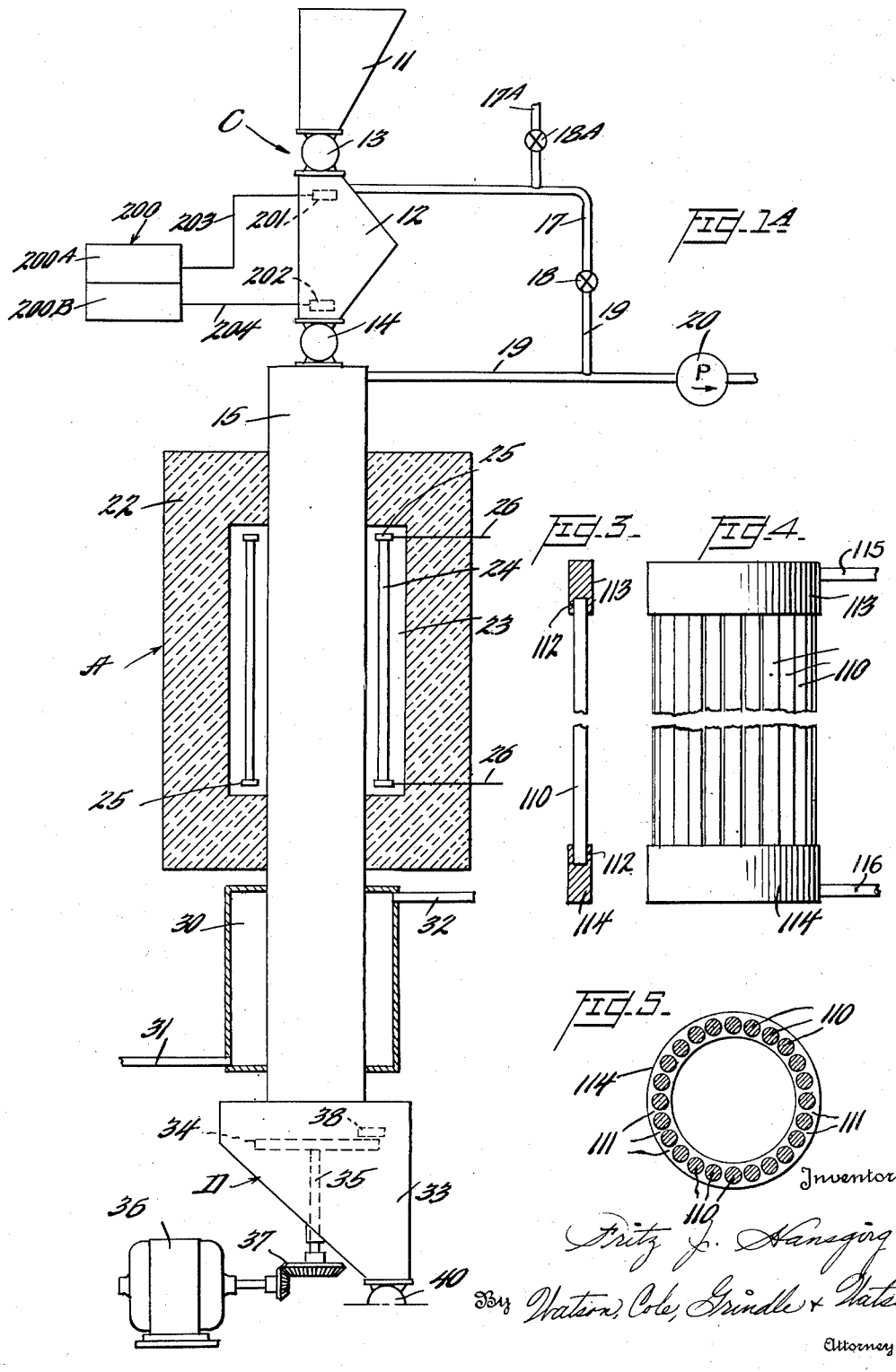

Oct. 9, 1951        F. J. HANSGIRG        2,570,232
CONTINUOUS PROCESS FOR RECOVERY OF MAGNESIUM
Filed June 26, 1945        3 Sheets-Sheet 2
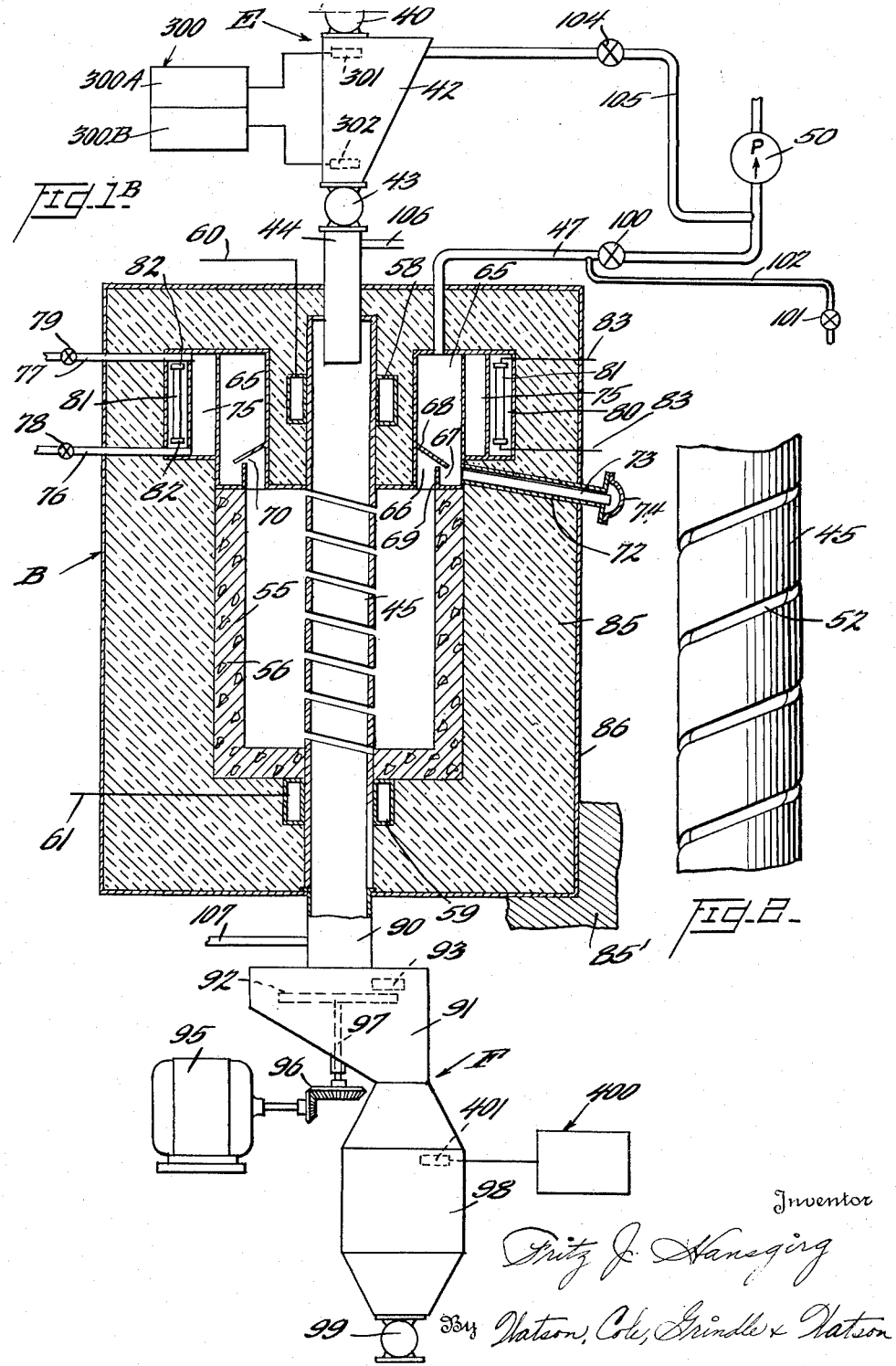
Inventor
Fritz J. Hansgirg
By Watson, Cole, Grindle & Watson
Attorney

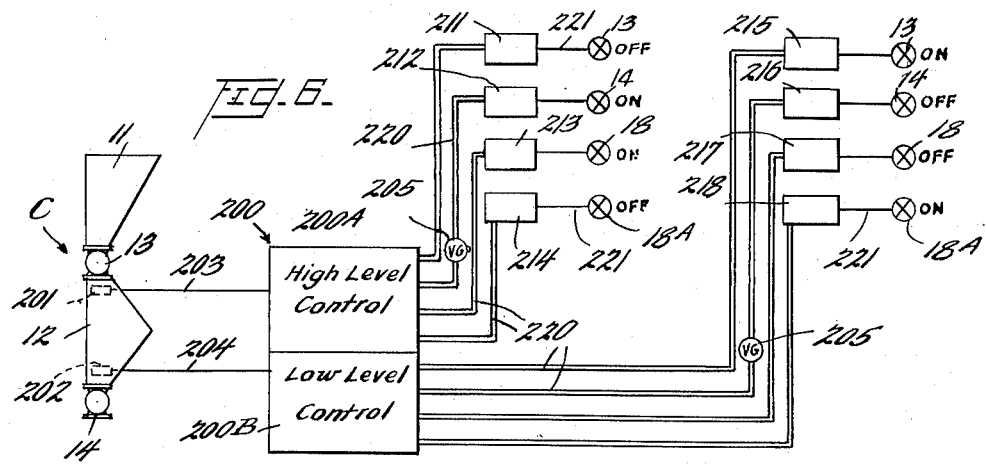
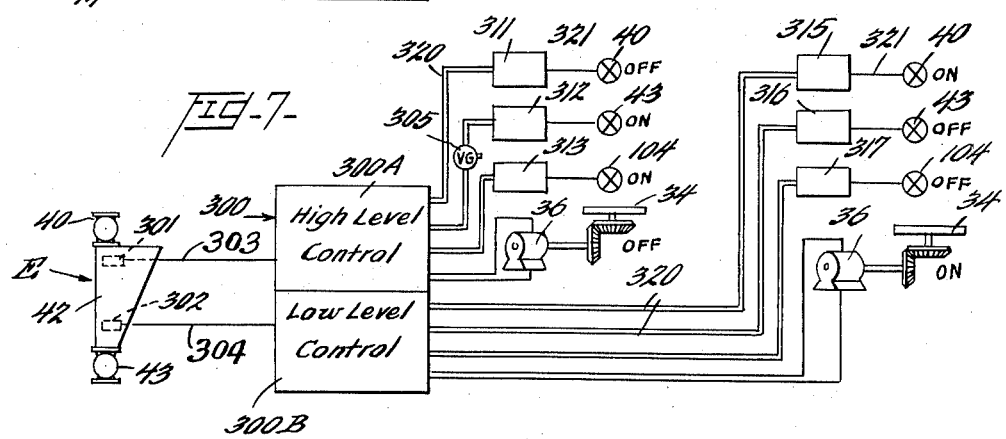
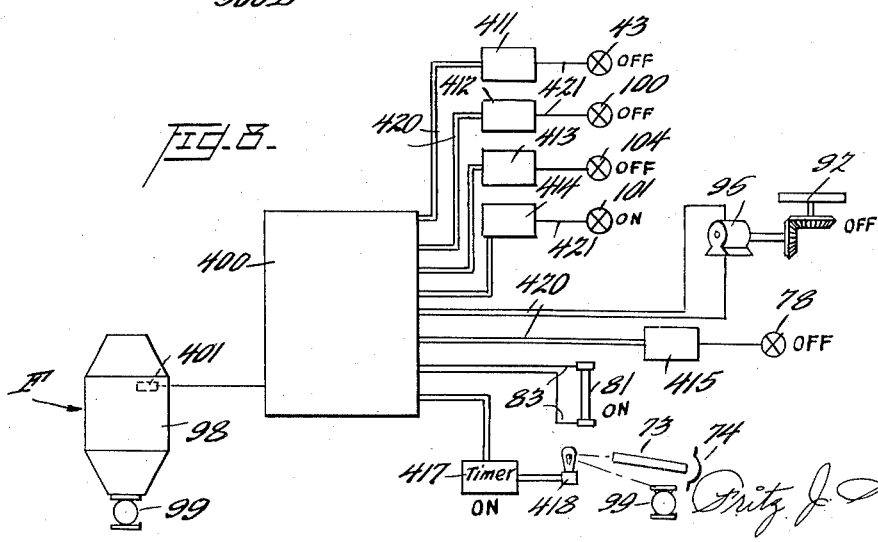

Patented Oct. 9, 1951

2,570,232

UNITED STATES PATENT OFFICE 2,570,232

CONTINUOUS PROCESS FOR RECOVERY OF MAGNESIUM

Fritz J. Hansgirg, Black Mountain, N. C., assignor to North Carolina Magnesium Development Corporation, Asheville, N. C., a corporation of North Carolina Application June 26, 1945, Serial No. 601,701

6 Claims. (Cl. 75—67)

This invention relates to the production of metallic magnesium, and has for its general object the provision of novel methods for producing magnesium by a substantially continuous process.

In thermal reduction processes, as pursued at the present time, either by reduction of raw material containing magnesium oxide by means of calcium carbide, ferro-silicon, silicon carbide, or similar reducing agents, or in the distillation of magnesium dust which has been recovered by a thermal reduction process, batch methods are employed. In all of these processes, the problem involves heating the starting materials to temperatures of between 1000° and 1300° C. in a high vacuum; and in the case of the recovery of magnesium from dust produced by the thermal reduction method, temperatures of from 600° to 750° C. are necessary, while also maintaining high vacuum conditions. The necessity for introducing the raw materials into high vacuum and the fact that magnesium at its melting point already has a vapor pressure of 2.5 mm. of mercury (absolute pressure), makes it exceedingly difficult to provide a continuous process. Several proposals have been made looking toward the solution of the problem of continuous distillation, but the difficulties in providing suitable apparatus have been considered insuperable and the simpler arrangements for batch processes have been considered more economical and practical.

It is therefore one of the principal aims of the present invention to provide methods for carrying on the thermal reduction of magnesium compounds in a substantially continuous, or semi-continuous way. That is to say, the apparatus in which the process is carried on does not have to be opened to the atmosphere for the introduction of the starting materials nor for the removal of the magnesium produced or the waste material, the introduction and withdrawal of the materials and their transfer from one stage to the other being preferably automatically effected according to a time cycle adjusted for the specific raw materials and reducing agents employed.

In all of the above mentioned reduction process, a vacuum of at least 1 mm. to 0.1 mm. of mercury (absolute pressure) is necessary. It is therefore essential that the magnesium be condensed in the solid state since only solid magnesium has a vapor pressure below the degree of vacuum mentioned.

It has previously been proposed, in the distillation of magnesium dust produced by carbothermal reduction methods, to tablet the dust and to use the tablets as resistors through which an electric current may be passed. The magnesium vapors are then withdrawn from the mass of tablets through openings or slits in the heating chamber and thence to be conducted to exteriorly arranged condensing chambers which are maintained at temperatures proper for the condensation of the magnesium in liquid form. Such arrangements turned out to be quite impractical since the condensation of magnesium in the liquid state is attended by great difficulties. Also such procedure is only applicable to the distillation of metallic magnesium which has already been previously extracted and which can be evaporated at much lower vacuums, say between 10 and 20 mm. absolute pressure, so that liquid condensation is actually possible to some extent. But, of course, such processes become inoperative when a higher vacuum is necessary in carrying out the reduction process, as for example with reducing agents such as calcium carbide, ferro-silicon, silicon carbide, or aluminum alloys. Also, it may be mentioned that the method of using tablets as resistors to which reference has been made, is attended with great difficulties, since in the larger types of equipment, irregular heat distribution takes place, and since all of these materials have a temperature coefficient of resistivity which reduces with an increase in temperature, the current concentrates on such zones of lower resistance which therefore increase in temperature so that any such preferred path for the current gives rise to very irregular heat distribution.

It is also impractical to introduce any considerable amounts of tablets directly from the open air into high vacuum equipment since these tablets are all of a porous nature and contain occluded gases which would be liberated as they entered a high evacuated evaporation or reduction zone, and the vacuum would lower to such a degree that the reduction would stop. The continuous introduction of fresh material into any process of this type would involve the utilization of very large and powerful vacuum pumps.

In order to overcome the difficulties attending the introduction of raw materials, whether tableted or not, into a high vacuum chamber, the present invention contemplates introducing the materials first into a preheating chamber in which they are heated to such a temperature, under moderate vacuum conditions, that no actual reduction or evaporation of magnesium takes place but all occluded gases are liberated from the raw materials to be reacted or treated. It is desirable that such preheating take place at a temperature at which the formation of magnesium vapors would just begin, or at which magnesium already previously produced would start to evaporate. The vacuum applied is also only slightly different from the vacuum applied later for the actual reduction or distillation. The temperature and vacuum conditions applied according to the invention will vary somewhat with the reducing agent and raw material employed, but in the specific example described, certain exemplary temperatures and pressures will be mentioned in connection with the reducing agents calcium carbide and ferro-silicon. Suitable temperature and pressure conditions will also be suggested in connection with the distillation of magnesium dust.

Again, in equipment at present in use for the thermal reduction of magnesium with calcium carbide, ferro-silicon and similar materials, evaporation takes place from retorts which are externally heated. The same holds true for the distillation of magnesium dust resulting from a thermal reduction process. In all such arrangements in which steel retorts are employed, a very high heat resistant steel must be used in order to withstand the vacuum at high temperatures. The disadvantage of retorts generally, resides in the fact that the magnesium vapors evolved from the reaction products have to pass through the whole charge before they enter the condensation chamber. To eliminate this disadvantage the applicant has already proposed, in his United States Patents Nos. 2,309,643, 2,309,644 and 2,310,138, to insert within the retort a system of shutters similar to Venetian blinds, through which the magnesium vapors can be withdrawn to a central cylindrical open space, without having to pass through the mass of raw material charged into the retort. According to the system forming the subject of the present invention, no exteriorly heated retort is used, and furthermore the method of using the tableted starting material as a resistor for the electric current, is generally avoided or applied to such a degree that the flow of the current is well controlled. In accomplishing this object, the invention contemplates the provision of retorts in which the retort wall itself comprises the resistant conductor for the passage of the electric current. Metal retorts, made of certain heat resistant steels, could possibly be employed but even the best heat resisting alloys at the high temperatures used may become quite soft so that the structure might deform or even collapse. Therefore, it is preferred that there be used for the retort walls, materials of high electric resistance and high melting points, for example carbon, graphite, or silicon carbide. Alternative forms of these heating chambers will be specifically described in the present specification and it is understood that the upper and lower portions of the retort walls are connected respectively with the current supply so that the retort between these points is highly heated and the material to be reacted moves downwardly by gravity within the heating chamber.

Other objects and features of novelty will be apparent from the following specification when read in connection with the accompanying drawings in which certain embodiments of the invention are illustrated by way of example.

In the drawings,

Figs. 1A and 1B show vertically aligned portions of one form of apparatus which may be employed in pursuing the invention, the disclosure being somewhat schematic with conventional parts and devices being indicated diagrammatically, and the structure being for the most part shown in vertical section;

Fig. 2 is a fragmentary enlarged view in side elevation of one form of heating, reducing, or evaporating retort;

Figs. 3, 4, and 5 are views in fragmentary elevation, vertical section, and horizontal section, of an alternative form of retort which may be used in substitution for the one illustrated in Figs. 1B and 2 of the drawings; and Figs. 6, 7, and 8 are diagrams of the automatic controls which are adapted to be actuated by the passage of the material past points at the inlet and discharge portions of the apparatus and also at an intermediate transfer point, where the material passes from the pretreatment chamber to the retort.

Referring particularly to Figs. 1A and 1B of the drawings, it will be seen that the pretreatment portion of the apparatus designated A is adapted to be superposed upon the retort portion B, and above the pretreating section A a lock chamber charging section C is disposed. Between the pretreatment section A and the retort section B there is disposed a discharge chamber D which introduces the pretreated material into a lock hopper arrangement E. Finally, the waste material from the retort B leaves the apparatus through a discharge section F.

The charging arrangement C comprises a bin or hopper 11 into which the raw materials, including the magnesium containing compounds and the reacting materials, are adapted to be placed. For example, in the reduction of a magnesium-silicate with calcium-carbide, a pre-reduced magnesium silicate ore is mixed with the stoichiometric amount of calcium carbide and pressed into tablets which are charged into the bin or hopper 11. The material may be fed into the lock chamber 12 by opening the valve 13. Another valve 14 may be opened to discharge the material from the lock chamber 12 into the pretreatment chamber 15 which comprises an elongated vertical cylindrical chamber passing centrally through the pretreatment installation A. The lock chamber 12 may be periodically subjected to vacuum from the line 17, a valve 18 controlling the connection of the line 17 with the vacuum line 19 leading to the vacuum pump 20. The line 19 connects directly with the pretreatment chamber 15.

Surrounding the pretreatment chamber 15 is the insulated casing 22 having an annular internal heating chamber 23 in which are disposed an annular series of vertical resistor rods 24. Conductor rings 25 are disposed at the upper and lower ends respectively of these rods and these rings are connected to a suitable source of heating current by means of the lines 26. The resistors and the source of current are of such a nature that a temperature of between 900° and 950° C. may be maintained in the heating chamber.

The lower end of the pretreatment chamber 15 extends beyond the furnace 22, 23 and is surrounded by a cooling water jacket 30 which is supplied by the pipes 31 and 32. It may become necessary to cool the charge by means of this water jacket before it enters the hopper connecting the pre-treatment chamber 15 with the other portions of the apparatus.

From the pretreatment chamber 15 the material passes into the discharge device D which consists of a hopper 33 in which a rotating disk 34 is carried upon the end of a shaft 35 adapted to be driven by the motor 36 through the bevel gears 37. A scraper element 38 cooperates with the disk 34 and may be adjusted to control the discharge of material from the disk 34.

From the hopper 33 the pretreated material is passed through the valve 40 into a lock or charging chamber 42, and from thence through the valve 43 into a charging chute 44 which is introduced into the retort 45 within the retort furnace B. By operating the valves 40 and 43, the lock chamber 42 may be alternately placed in communication with the vacuum system of the pretreatment chamber 15 or that of the reducing or distilling retort 45. The vacuum in the reduction retort system B is maintained through a line 47 which leads to the high vacuum pump 50. The other connections from this pump will be later described.

The retort chamber comprises the elongated cylindrical tube 45 which in this embodiment consists of a tube of carbon provided with a spiral slit 52 through which the magnesium vapors may pass into the surrounding chamber 55, the chamber 55 being lined with blocks or "stones" of carbon indicated at 56. Adjacent the upper end of the retort tube 45 is the annular water cooled contact ring 58, and a similar ring 59 is secured to the lower portion of the tube, both of these rings being connected with a suitable source of current by the leads 60 and 61.

Within the upper portion of the retort casing B and surrounding the upper portion of the retort tube 45 is the annular condensing chamber 65, this chamber being provided with an inlet passageway 66 for magnesium vapors and a trough or gutter 67 for cooling the condensed magnesium. A conical flange 68 cooperates with the vertical flange 69 to provide a narrow circular gas passageway 70 for admitting the vapors to the condensing chamber 65. An inclined discharge duct 72 leads from the trough 67 and this passageway is provided with a refractory or carbon plug 73 and a cover or closure 74 both of which are adapted to be removed when the magnesium is periodically tapped from the trough 67.

The condensing chamber 65 is provided with a jacket 75 through which an air or gas stream can be circulated, this stream entering through the line 76 and leaving through the line 77, these lines being respectively controlled by valves 78 and 79.

Heating means are provided for the condensing chamber 65 within the outer annular casing 80, this heating means comprising an annular series of resistor rods 81 having rings 82 at the upper and lower ends, which rings are connected with a source of current by the leads 83.

All of these chambers and retort passageways are enclosed within the insulation 85 which is in turn covered by the shell or outer wall 86 which houses the entire retort system B.

A tubular lower extension 90 extends from the lower end of the retort tube 45 exteriorly of the casing 86, and waste material is discharged from the retort through this extension into the discharge mechanism F which consists of the discharge hopper 91 in which a rotating disk 92 is provided similar to the disk 34 described in connection with the hopper 33 in the discharge arrangement D. A scraper 93 is associated with the disk and a motor 95 serves to rotate the disk through the gearing 96 and the shaft 97. The motor 95 is of the variable speed type by means of which the rate of discharge of the waste into the bin 98 may be controlled. The waste material may be periodically discharged from the bin 98 through the valve 99.

As already indicated the vacuum line 47 leads from the condensing chamber 65 which is also in communication with the interior of the retort 45 and the surrounding chamber 55. The pipe 47 may be placed in communication with the high vacuum pump 50 by means of the valve 100. The line may also be placed in communication with a source of supply of a gas which is inert to magnesium, by means of the valve 101 and the pipe line 102. Such gas may be hydrogen or one of the inert gases, argon, helium, or the like. A valve 104 in the line 105 serves to connect the intermediate lock chamber 42 with the vacuum pump 50.

A connection 106 is provided in the tube 44 which introduces the material into the retort 45, and a similar connection 107 communicates with the discharge portion 90 leading from the retort 45. A small quantity of an inert gas can be introduced through these lines during the operation to prevent any condensation of magnesium vapors in the zones where the raw material is charged and the waste withdrawn.

In Figs. 3, 4, and 5 of the drawings there is illustrated an alternative form of retort which may be substituted for the tube 45. In this embodiment the walls of the retort consist of an annular series of vertically disposed rods 110, these rods being made of carbon, graphite, silicon carbide or other resistant material. Narrow spaces 111 are left between the rods through which the magnesium vapors may escape. All of the rods 110 are socketed as at 112 in the upper and lower annular rings 113 and 114, which rings are connected with a source of current by means of the conductors 115 and 116.

Of course the retort chamber may be varied still further, the rods 110 being arranged in either a circular form or in helical or rectangular configuration. The slits between the rods are of course small enough to retain the tablets and prevent their falling out into the surrounding chamber 55.

The surrounding insulating material 85 is selected so as to provide a jacket which is not too porous. The whole arrangement is placed within the jacket 86 which can be maintained at a temperature of approximately 500° C., and if desired an outer jacket of porous or non-porous insulating material may be provided as suggested at 85' in Fig. 1B.

In cases where magnesium containing materials like powdered magnesium oxide or magnesium silicate ores are to be reduced with calcium carbide, the pretreatment zone within the chamber 15 has to be maintained at temperatures around 900° to 950° C. and at a vacuum of from about 1 to 2 mm. of mercury absolute pressure. It is of course also possible to use a vacuum of between from 1 to 10 mm. Under a vacuum of 1 mm. there may be some magnesium losses in the pretreatment stage, and on the other hand a vacuum of 10 mm. may not lead to a satisfactorily thorough degassing of the raw materials. For mixtures of dolomite with ferro-silicon, a pretreatment temperature of from about 1050° to 1100° C. and a vacuum of between 1 mm. and 3 mm. pressure is of advantage.

The magnesium vapors condense on the surface of the chamber 65 in solid form usually at a temperature range of 400° and 600° C.

The operation of the installation may be effected entirely automatically or by manual control. In the latter case the raw materials and reducing agents in pellet form may be placed in the charging bin 11. Then with the charging valve 14 closed, the valve 18 closed so as to cut off the vacuum from the lock chamber 12, and the valve 18A opening the chamber to the atmosphere, the material valve 13 is opened and the lock 12 filled. Then the valve 13 is closed, the valve 18A is closed, and the valve 18 opened to vacuum. The valve 14 may then be opened and the material discharged into the pretreatment chamber 15. In the pretreatment chamber the material is heated by passing through the zone which is surrounded by the furnace 23, 24.

When the material from the pretreating installation A is to be transferred to the retort installation B, the material valve 43, the gas valve 101, and vacuum valves 100 and 104 are closed, the valve 40 is opened and the motor 36 starts the discharge mechanism 34 operating. The pretreated material is charged into the lock chamber or bin 42 and then the motor 36 is stopped, the valve 40 closed, the vacuum valves 100 and 104 opened and then after operation vacuum has been reached the valve 43 is opened so that the material can be charged into the reaction chamber 45.

When sufficient material has been charged into the retort tube 45 it is heated to the reaction temperature approximately between 900° and 950° C. by means of current supplied through the leads 60 and 61 to the conductor rings 58 and 59 at opposite ends of the resistant retort tube 45. During the reduction or volatilization of a charge, cooling air is admitted through the valve 78 to the jacket 75 and exhausted through the outlet valve 79. This keeps the condensation chamber 65 at the proper temperature to cause the vaporized magnesium to condense on the walls. At the same time valve 100 is maintained open and the high vacuum pump 50 reduces the pressure within the reaction chamber to the desired degree.

After the deposit in the condensing chamber 65 has reached a predetermined thickness, the flow of material in the reduction chamber is stopped, the vacuum valves 100 and 104 are closed, and the vacuum in the portion of the system including the charging bin or lock 42, the reaction chamber 45, the discharge hopper 91, and the waste bin 98 is released by opening the valve 101, thus admitting a quantity of inert gas. The air cooling of the condensing chamber 65 is stopped by shutting off the valves 78 and 79 and the current supplied through the leads 83 to the heater 81 is turned on so that the condensing chamber is raised to a temperature at which the magnesium melts down from the walls and runs into the gutter 67, that portion of the magnesium which has adhered to the inner wall of the chamber being guided into the gutter by means of the conical eaves 68. To discharge the molten magnesium the cover 74 is removed from the outlet tube 72 and the inserted carbon rod or plug 73 is withdrawn and the magnesium tapped from the opening in liquid form. At the same time the waste material may be withdrawn from the chamber 98 through the valve 99. After this, the rod 73 is re-introduced into the discharge pipe 72, the vacuum-tight cover 74 is closed and the system placed under vacuum again by opening valves 100 and 104 (of course, after closing gas valve 101). After full vacuum has been reached, the discharge mechanism 92 is turned on again to continue the operation.

In carrying out the process in a substantially automatic way, the opening and closing of the valves and the connection and disconnection of the vacuum pumps can be effected by remote control electrical or electronic devices or "robots." It can easily be determined by experiment how much magnesium a certain volume of tablets will produce when a certain raw material mixture is used. This ratio gives the relationship between the volume accumulating in the waste chamber 98 and the volume of magnesium accumulating in the condensing chamber 65. A level controlled device 401 is arranged in the upper portion of the waste receiving chamber 98 at a point where the waste representing one charging of material will reach. When the waste material discharged by the rotating disk mechanism 92 reaches the level of the element 401, controlling mechanism in the "robot" 400 is actuated. This mechanism is preferably electrical and the level indicator or level responsive element 401 may comprise any sort of switching device which will be actuated by the rising level of pulverulent waste material. The devices disclosed in United States Patents 1,578,563, 1,951,980, and 1,977,228 are only a few examples of devices of this kind which may be utilized.

Referring now to Figure 8 of the drawings, it will be seen that the switching mechanism in the "robot" 400 will serve to actuate the controlling motors 411, 412, 413, etc. to control the several valves and motors as will now be described. The actuating or controlling motors 411, 412, 413, etc. are connected with the master controlling device or robot 400 by means of the pairs of conductors 420, and upon actuation of the level responsive element 401, current is supplied to the motor 411 which is connected with the material introducing valve 43 as by means of the shaft 421 to turn this valve off, if it is on and to keep it turned off if it has already been turned off by other controls. Similarly the motor 412 acts through a corresponding shaft 421 to turn the vacuum valve 100 off. The motor 413 is actuated to turn the vacuum valve 104 off, which will disconnect the lock 42 from the vacuum pump 50. Motor 414 turns the valve 101 on, thus admitting inert gas to the retort and condensing system. This same actuation of the level responsive member 401 turns the motor 95 off and stops the delivery mechanism 92. Similarly the motor 415 serves to turn the cooling air admitting valve 78 off and at the same time the heating elements supplied through the leads 83 are turned on to start the melting of the deposited magnesium.

The time necessary to melt down the magnesium can be easily determined experimentally, and the timing mechanism 417 can be adjusted so as to give a signal such as a visual signal afforded by the light 418 which when observed by the operator will indicate to him that it is time to remove the cover 74 and the plug 73 and tap the magnesium, and also to open the discharge valve 99 to empty the container 98.

In order to keep the charging bin 42 independently filled with pretreated raw materials a second controlling device or robot 300 is provided. This controller has one section 300A adapted to be energized by a high level responsive element 301 and another section 300B to be energized by the low level control device 302. These elements 301 and 302 are connected respectively to the control devices by the conductors 303 and 304. When the material discharged into the retort through the valve 43 reaches the low level 302, the device 300B is energized to close the valves 43 and 104, open the valve 40 and start the motor 36 for operating the discharge mechanism 34. Then the pretreated raw material is charged into the hopper or lock chamber 42 until the level 301 is reached. At this point the high level control portion 300A of the mechanism 300 is energized to close the valve 40, shut off the delivery motor 36, and if the lowermost system of controls centered about robot 400 permits it, open the valves 43 and 104. It will be noted that in the conductor line 320 leading to the motor 312 which controls the valve 43 there is disposed a vacuum gage which delays the energizing of the motor 312 until operation vacuum has been reached. The several valves and discharge mechanisms are adapted to be actuated by the indicated motors 311, 312, 313, etc., through the shafts 321.

In a similar fashion, a third electrical or electronic controller 200 is employed to control the initial charging mechanism C. This device comprises a high level control portion 200A adapted to be activated through the conductor 203 from the high level responsive element 201 and a low level control portion 200B energized by the low level responsive element 202. When the low level responsive element 202 is actuated, the control 200B is energized to actuate the appropriate motors to open the valve 13, to close the valve 14, to close the vacuum valve 18, and to open the valve 18A venting the chamber 12 to the atmosphere. After the lock chamber 12 has been filled to the level 201, the high level control 200A is energized to turn the valve 13 off, to turn the valve 14 on, to turn the vacuum valve 18 on, and to close the valve 18A leading to the atmosphere. The operation of valve 14 is dependent upon the attainment of the necessary operating vacuum, and for this purpose the vacuum gage 205 is interposed in the line 220 leading to the motor 212 which actuates this valve.

Thus it will be seen that with such automatically controlled devices, it is possible to maintain the correct operation of this installation with very few workers.

It is understood that various changes and modifications may be made in the embodiments illustrated and described herein without departing from the scope of the invention as defined in the following claims.

Having thus described the invention what is claimed as new and desired to be secured by Letters Patent is:

1. A continuous process for the recovery of metallic magnesium, which is applicable to the thermal reduction method involving non-carbothermal reduction of magnesium and which will not evolve gaseous products, and to the evaporation of magnesium contained in the dust produced by thermal reduction methods; which process comprises establishing two consecutive treatment zones under separate vacuum conditions, the first for pretreatment and the second for evolution of magnesium; feeding successive charges of raw material through the pretreatment zone and thence into the second named zone without exposure to the atmosphere or substantial loss of vacuum in either zone; heating the charges while in said pretreatment zone at such elevated temperatures under such vacuum conditions that only a slight evolution of magnesium vapors begins to take place and any occluded gases are removed; heating said charges after they have been moved to the second named zone to a high temperature under vacuum conditions to evolve magnesium vapor; and condensing said vapor.

2. A continuous process for the recovery of metallic magnesium, which is applicable to the thermal reduction method involving non-carbothermal reduction of magnesium and which will not evolve gaseous products, and to the evaporation of magnesium contained in the dust produced by thermal reduction methods; which process comprises establishing two consecutive treatment zones under separate vacuum conditions, the first for pretreatment and the second for evolution of magnesium; feeding successive charges of raw material through the pretreatment zone and thence into the second named zone without exposure to the atmosphere or substantial loss of vacuum in either zone; heating the charges in said pretreatment zone at such elevated temperatures under such vacuum conditions that only a slight evolution of magnesium vapors begins to take place and any occluded gases are removed; reducing the temperature of said charges before moving them from said pretreatment zone, as for the purpose of preventing injury to parts of the apparatus used; heating said charges after they have been moved to the second named zone to a high temperature under vacuum conditions to evolve magnesium vapor, and condensing said vapor.

3. A continuous process for the recovery of metallic magnesium, which is applicable to the thermal reduction method involving non-carbothermal reduction of magnesium and which will not evolve gaseous products; which process comprises establishing two consecutive treatment zones under separate vacuum conditions, the first for pretreatment and the second for reaction; feeding successive charges of raw material through the pretreatment zone and thence into the reaction zone without exposure to the atmosphere or substantial loss of vacuum in either zone; heating the charges in said pretreatment zone at a temperature of from about 900° C. to about 1100° C. and under a vacuum of from about 10 mm. to about 1 mm., whereby only a slight evolution of magnesium vapors begins to take place and any occluded gases are removed; reducing the temperature of said charges before moving them from said pretreatment zone, as for the purpose of preventing injury to parts of the apparatus used; heating said charges after they been moved to the reaction zone at a temperature of from about 1100° C. to about 1300° C. and under a vacuum of from about 1 mm. to about 0.1 mm. to evolve magnesium vapor; and condensing said vapor.

4. A continuous process for the recovery of metallic magnesium, which is applicable to the evaporation of magnesium contained in the dust produced by thermal reduction methods; which process comprises establishing two consecutive treatment zones under separate vacuum conditions, the first for pretreatment and the second for evaporation of magnesium; feeding successive charges of raw material through the pretreatment zone and thence into the evaporation zone without exposure to the atmosphere or substantial loss of vacuum in either zone; heating the charges in said pretreatment zone at a temperature of from about 600° C. to about 750° C. and under a vacuum of from about 10 mm. to about 1 mm., whereby only a slight evolution of magnesium vapors begins to take place and any occluded gases are removed; reducing the temperature of said charges before moving them from said pretreatment zone, as for the purpose of preventing injury to parts of the apparatus used; heating said charges after they have been moved to the evaporation zone to a temperature of from about 600° C. to about 750° C. and under a vacuum of from about 1 mm. to about 0.1 mm. to evolve magnesium vapor; and condensing said vapor.

5. A continuous process for the recovery of metallic magnesium, which is applicable to the thermal reduction method involving non-carbothermal reduction of magnesium and which will not evolve gaseous products, and to the evaporation of magnesium contained in the dust produced by thermal reduction methods; which process comprises establishing two consecutive treatment zones under separate vacuum conditions, the first for pretreatment and the second for evolution of magnesium; feeding successive charges of raw material through the pretreatment zone and thence into the second named zone without exposure to the atmosphere or substantial loss of vacuum in either zone; heating the charges in said pretreatment zone at such elevated temperatures under such vacuum conditions that only a slight evolution of magnesium vapors begins to take place and any occluded gases are removed; reducing the temperature of said charges before moving them to said second named zone, as for the purpose of preventing injury to parts of the apparatus used; heating said charges after they have been moved to the second named zone to a high temperature under vacuum conditions to evolve magnesium vapor, and condensing said vapor.

6. A continuous process for the recovery of metallic magnesium, which is applicable to the thermal reduction method involving non-carbothermal reduction of magnesium and which will not evolve gaseous products; which process comprises establishing two consecutive treatment zones under separate vacuum conditions, the first for pretreatment and the second for reaction; feeding successive charges of raw material through the pretreatment zone and thence into the reaction zone without exposure to the atmosphere or substantial loss of vacuum in either zone; heating the charges in said pretreatment zone at a temperature of from about 900° C. to about 1100° C. and under a vacuum of from about 10 mm. to about 1 mm., whereby only a slight evolution of magnesium vapors begins to take place and any occluded gases are removed; heating said charges after they have been moved to the reaction zone at a temperature of from about 1100° C. to about 1300° C. and under a vacuum of from about 1 mm. to about 0.1 mm. to evolve magnesium vapor; and condensing said vapor.

FRITZ J. HANSGIRG.

REFERENCES CITED

The following references are of record in the file of this patent:

UNITED STATES PATENTS

| Number | Name | Date |
| --- | --- | --- |
| 2,011,288 | Kemmer | Aug. 13, 1935 |
| 2,219,059 | Suchy et al. | Oct. 22, 1940 |
| 2,258,374 | Amati | Oct. 7, 1941 |
| 2,310,188 | Hansgirg | Feb. 2, 1943 |
| 2,362,718 | Pidgeon | Nov. 14, 1944 |
| 2,391,156 | Hansgirg | Dec. 18, 1945 |
| 2,391,193 | Rademaker | Dec. 18, 1945 |
| 2,430,389 | Chubb | Nov. 4, 1947 |